United States Patent Office 3,002,011
Patented Sept. 26, 1961

---

3,002,011
INTERMEDIATES AND PROCESSES FOR PRODUCING α-LIPOIC ACID
Frederick W. Holly, Cranford, and Arthur F. Wagner, Princeton, N.J., assignors to Merck & Co., Inc., Rahway, N.J., a corporation of New Jersey
No Drawing. Original application Dec. 4, 1953, Ser. No. 396,333, now Patent No. 2,853,497, dated Sept. 23, 1958. Divided and this application Nov. 23, 1956, Ser. No. 623,823
24 Claims. (Cl. 260—399)

This invention relates to 6,8-dithioloctanoic acid. More particularly, this invention is concerned with novel processes and intermediates useful in the production of 6,8-dithioloctanoic acid.

In the preparation of the valuable growth stimulating substance called α-lipoic acid or 5-[3-(1,2-dithiacyclopentyl)] pentanoic acid, it has been found that this substance may be conveniently prepared by oxidation of 6,8-dithioloctanoic acid to the desired cyclic compound by procedures disclosed in the J. Am. Chem. Soc. 74, 3455 (1952). However, none of the known methods of producing 6,8-dithioloctanoic acid and related compounds are entirely suitable for this purpose because of involved procedures, low yields and the resulting high cost of production.

Therefore, an object of this invention is to provide novel processes and intermediate compounds which are particularly satisfactory for the synthetic production of 6,8-dithioloctanoic acid. Another object is to provide novel chemical compounds of use in the preparation of other valuable compounds.

It has now been discovered according to one embodiment of the present invention that 6,8-dithioloctanoic acid (IV) may be conveniently produced by the process which comprises reducing a 6,8-(hydrocarbon substituted mercapto)-5-oxocaprylic acid (I) to produce a 6,8-(hydrocarbon substituted mercapto)-5-hydroxycaprylic acid which cyclizes to the corresponding δ-lactone (II), reacting said lactone with a suitable reducing agent to produce a 6,8-(hydrocarbon substituted mercapto) caprylic acid (III) and subsequently converting said compound to 6,8-dithioloctanoic acid by reacting it with an agent suitable for cleaving such thioethers. This process may be illustrated as follows:

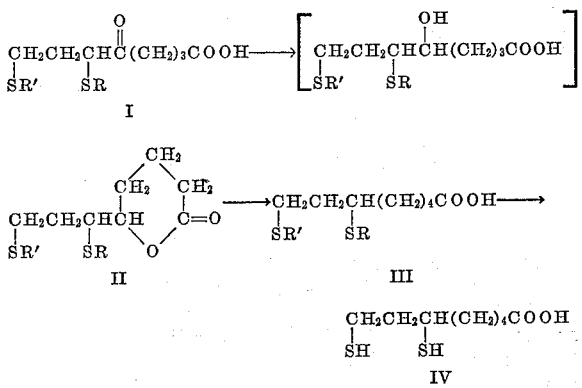

wherein R and R' represents the same or different hydrocarbon substituents.

The first step in this process comprises reduction of the 6,8-(hydrocarbon substituted mercapto)-5-oxocapyrlic acids to the corresponding 5-hydroxy compounds and δ-lactones thereof. To effect this reduction, ordinary reducing agents such as the borohydride salts including sodium borohydride, sodium trimethoxy borohydride, potassium borohydride and lithium borohydride are employed. The described reaction is conveniently achieved by contacting the oxocapyrlic acid with a suitable borohydride salt in the presence of a suitable solvent. Generally an excess of the borohydride salt is employed to attain optimum results. Examples of some solvents in which the reaction can be effected are aqueous alcohols such as methanol, ethanol and isopropanol and solvents such as tetrahydrofuran, dioxane, isopropylamine, pyridine and water. At ordinary temperatures the reaction proceeds to completion in from about 1 to 3 hours to form an intermediate metal complex.

An acid such as hydrochloric acid or sulfuric acid is added to decompose the metal complex and produce the desired 6,8-(hydrocarbon substituted mercapto)-5-hydroxycaprylic acid. Under acidic conditions, however, the resulting hydroxy acid cyclizes to the corresponding δ-lactone and ordinarily is isolated in this form. Alternatively, formation of the hydroxy acid structure is achieved by the addition of an alkaline agent sufficient to produce basic conditions. The presence of a base opens the δ-lactone and yields the hydroxy acid as a salt which may be isolated if desired. Such products may be isolated by conventional techniques. Thus, the δ-lactone is isolated by extraction of the acidic reaction mixture with an immiscible solvent such as chloroform and subsequent distillation.

The 6,8-(hydrocarbon substituted mercapto)-5-oxocaprylic acids which can be reduced in the described manner may have hydrocarbon substituents which are the same or different alkyl, alkenyl, alkynyl, aryl and aralkyl groups. This reduction, however, is more readily effected when such hydrocarbon substituents have 8 carbons or less, and in the synthesis of α-lipoic acid, it is preferred to utilize those compounds in which the hydrocarbon substituents are the same (bis) lower alkyl or alkenyl groups. Examples of compounds which are suitable for use in this reaction that might be mentioned are 6,8-bis(methylmercapto)-5-oxocaprylic acid, 6,8-bis(ethylmercapto)-5-oxocaprylic acid, 6,8-bis(propylmercapto)-5-oxocaprylic acid, 6,8-bis(butylmercapto)-5-oxocaprylic acid, 6,8-bis(phenylmercapto)-5-oxocaprylic acid, 6,8-bis(benzylmercapto)-5-oxocaprylic acid, 6,8-bis(allylmercapto)-5-oxocaprylic acid, 6,8-bis(2-methyl-1-ethyl-2-butenemercapto)-5-oxocaprylic acid, 6,8-bis(3-methyl-2-ethyl-2-pentenemercapto)-5-oxocaprylic acid, 6,8-bis(propargylmercapto)-5-oxocaprylic acid, 6-ethyl-mercapto-8-propylmercapto-5-oxocaprylic acid the like.

In a specific illustration of this reaction 6,8-bis(methylmercapto-5-oxocaprylic acid may be reacted with sodium borohydride and the mixture acidified to obtain 6,8-bis(methylmercapto)-5-hydroxycaprylic acid δ-lactone. Other similar compounds which may be produced from the appropriate reactants by the application of these methods are 6,8-bis(methylmercapto)-5-hydroxycaprylic acid, 6,8-bis(ethylmercapto)-5-hydroxycaprylic acid, 6,8-bis(propylmercapto)-5-hydroxycaprylic acid, 6,8-bis(butylmercapto)-5-hydroxycaprylic acid, 6,8-bis(phenylmercapto)-5-hydroxycaprylic acid, 6,8-bis(benzylmercapto)-5-hydroxycaprylic acid, 6,8-bis(allylmercapto)-5-hydroxycaprylic acid, 6,8-bis(2-methyl-1-ethyl-2-butenemercapto)-5-hydroxycaprylic acid, 6,8-bis(3-methyl-2-ethyl-2-pentenemercapto)-5-hydroxycaprylic acid, 6,8-bis(propargylmercapto)-5-hydroxycaprylic acid, 6-ethylmercapto-8-propylmercapto-5-hydroxycaprylic acid and the like and δ-lactones thereof.

According to the second step in this process the 6,8-(hydrocarbon substituted mercapto)-5-hydroxycaprylic acid δ-lactone is reduced to the corresponding 6,8-(hydrocarbon substituted mercapto) caprylic acid. This reaction is achieved with any suitable reducing agent and, for this purpose, phosphorous-iodine has been found to be particularly useful. The reaction is conveniently effected by contacting the reactants in an acidic medium such as aqueous acetic acid, or aqueous mineral acids such as hydrochloric and phosphoric acids. Elevated temperatures such as the reflux temperatures are ordinarily used to accelerate the reaction and under such conditions, from two to 20 hours is required to complete the reaction. After the reaction has been completed the unreacted iodine is reduced, as by the action of sodium bisulfite, and the product isolated from the mixture by conventional procedures. Thus, the 6,8-(hydrocarbon substituted mercapto) caprylic acids may be extracted with chloroform, the organic solution extracted with aqueous sodium bicarbonate, acidified, reextracted into chloroform and the solvent evaporated. The product can be purified by distillation.

Examples of some of the novel compounds which may be prepared according to this method from the corresponding δ-lactones are 6,8-(hydrocarbon substituted mercapto) caprylic acids wherein the hydrocarbon substituents are the same or different alkyl, alkenyl, alkynyl, aryl and aralkyl groups such as the compounds 6,8-bis(methylmercapto) caprylic acid, 6,8-bis(ethylmercapto) caprylic acid, 6,8-bis(propylmercapto) caprylic acid, 6,8-bis(butylmercapto) caprylic acid, 6,8-bis(phenylmercapto) caprylic acid, 6,8-bis(benzylmercapto) caprylic acid, 6,8-bis(allylmercapto) caprylic acid, 6,8-bis(2-methyl-1-ethyl-2-butenemercapto) caprylic acid, 6,8-bis(3-methyl-2-ethyl-2-pentenemercapto) caprylic acid, 6,8-bis(propargylmercapto) caprylic acid, 6-ethylmercapto-8-propylmercapto caprylic acid and other similar compounds.

Esters of the 6,8-(hydrocarbon substituted mercapto) caprylic acids are readily produced by reacting the caprylic acids with the appropriate alcohol in the presence of a suitable esterifying acid like mineral acids such as hydrochloric acid and sulfuric acid. This reaction is most conveniently effected at slightly elevated temperatures. Isolation of the esters is accomplished by the usual procedures such as evaporation of the solvents.

The 6,8-(hydrocarbon substituted mercapto) caprylic acids are also esterified by preparing the corresponding acyl halide and reacting it with an alkanol, aryl alcohol or aralkanol to produce the desired ester. The acyl halides used as intermediates in this process may be prepared by reacting a 6,8-(hydrocarbon substituted mercapto) caprylic acid with a suitable halogenating agent such as thionyl chloride, oxalyl chloride, phosphorous trichloride, phosphorous tribromide and the like in a conventional solvent or excess of the halogenating agent if liquid. The acyl halides thus produced are separated from the reaction mixture and esterified by contact with the appropriate alcohol to form the desired ester.

Some of the esters which are produced according to these procedures are the methyl, ethyl, propyl, benzyl and phenyl esters of the 6,8-(hydrocarbon substituted mercapto) caprylic acids previously disclosed herein.

In addition, salts of the 6,8-(hydrocarbon substituted mercapto) caprylic acids may also be produced by reacting the acid with an alkali metal or alkaline earth metal hydroxide, carbonate or bicarbonate. Some salts which may be produced in this way are the sodium, potassium, lithium, calcium and magnesium salts of the 6,8-(hydrocarbon substituted mercapto) caprylic acids.

The last step of this process is directed to conversion of the 6,8-(hydrocarbon substituted mercapto) caprylic acids to the desired 6,8-dithioloctanoic acid. This conversion is conveniently achieved with suitable ether cleaving agents such as anhydrous or concentrated aqueous mineral acids such as sulfuric acid, hydrochloric acid, hydrobromic acid, hydroiodic acid, phosphoric acid and thiourea hydrohalides such as isothiouronium chloride and bromide. To effect the reaction the reactants are preferably combined and heated at an elevated temperature up to about 100° C. for 1 to 5 hours. The reaction mixture is then cooled, extracted with a water immiscible solvent such as cloroform and the solvent evaporated under reduced pressure to obtain the desired 6,8-dithioloctanoic acid.

According to a further embodiment of the present invention the 6,8-bis(alkenyl or aralkyl substituted mercapto) caprylic acids are converted to 6,8-dithioloctanoic acid by hydrogenolysis with an alkali metal in liquid ammonia. This reaction may be illustrated as follows:

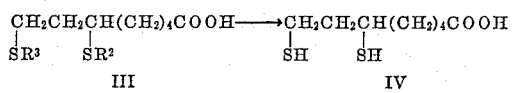

wherein $R^2$ and $R^3$ represent alkenyl and aralkyl groups.

The reaction is conveniently effected by adding the caprylic acid to liquid ammonia at about its boiling point and subsequently adding an alkali metal such as sodium, potassium or lithium to the resulting mixture. The reaction goes to completion quickly to form the desired product. Excess alkali metal is neutralized by the addition of ammonium salts and the product is conveniently recovered by allowing the ammonia to boil off. It is purified by acidification and extraction with a suitable solvent such as chloroform. In specific illustrations of this process 6,8-bis(allylmercapto) caprylic acid and 6,8-bis(benzylmercapto) caprylic acid are converted to 6,8-dithioloctanoic acid by reaction with sodium in liquid ammonia.

According to another embodiment of the present invention there is provided 5-hydroxy-5-[3-(1,2-dithiacyclopentyl)]pentanoic acid which may be briefly called 5-hydroxy α-lipoic acid, and processes for preparing this and novel intermediate compounds useful in these processes.

It is now found that 5-hydroxy-5[3-(1,2-dithiacyclopentyl)]pentanoic acid and its δ-lactone is obtained by treating a 6,8-bis(alkenyl or aralkyl mercapto)-5-hydroxycaprylic acid or δ-lactone thereof (II) with an alkali metal in liquid ammonia to produce 5-hydroxy-6,8-dithioloctanoic acid or the δ-lactone thereof (V) and oxidizing said compound to produce the desired dithiacyclo compound (VI). This process may be illustrated as follows in which the δ-lactones are employed as reactants and obtained in the process, but it is understood that the process is equally operable with the hydroxy acids:

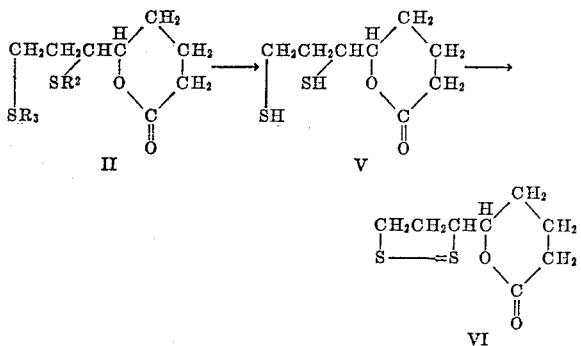

wherein $R^2$ and $R^3$ represent alkenyl and aralkyl groups.

The production of 5-hydroxy-6,8-dithioloctanoic acid and its δ-lactone is effected by reacting a 6,8-bis(alkenyl or aralkyl mercapto)-5-hydroxycaprylic acid or its δ-lactone with an alkali metal in liquid ammonia. The conditions suitable for achieving this reaction are substantially those which have been previously described in detail hereinabove in effecting a similar reaction. The product of the present reaction is a mixture of the hydroxy acid and δ-lactone structures although under the conditions of reaction the formation of a salt of the hydraxy acid is favored. Ordinarily, however, the product is isolated as the δ-lactone by neutralizing the excess alkali metal, removing ammonia, taking the residue up in aqueous acid and extracting with ether. Examples of some compounds which may be converted to the 5-hydroxy-6,8-dithioloctanoic acid and δ-lactone thereof are 6,8-bis(allylmercapto)-5-hydroxycaprylic acid and 6,8-bis(benzylmercapto)-5-hydroxycaprylic acid and other similar compounds disclosed herein.

Oxidation of 5-hydroxy-6,8-dithioloctanoic acid or the δ-lactone thereof to 5-hydroxy-5-[3-(1,2-dithiacyclopentyl)]pentanoic acid or the δ-lactone thereof is conveniently accomplished by treatment with an oxidizing agent such as iodine-potassium iodide. This reaction is readily achieved in an inert solvent such as ether at ordinary temperatures. The reaction goes to completion in a short time. The reaction mixture is then treated in the usual ways to recover the product. Thus, the mixture may be treated with sodium bisulfite to reduce excess iodine, washed with water and evaporated under reduced pressure to remove the solvent. The product is ordinarily obtained as the δ-lactone but under basic conditions the corresponding hydroxy acid may be obtained.

In the practice of this invention the 6,8-(hydrocarbon substituted mercapto)-8-oxocaprylic acids used as starting materials may be conveniently prepared according to processes disclosed by Wagner in U.S. patent application Serial No. 369,535 United States Patent No. 2,842,587, issued July 8, 1958 and by Holly, Wagner, Walton and Hoffman in U.S. patent application Serial No. 396,334 United States Patent No. 2,809,978, issued October 15, 1957.

EXAMPLE 1

*6,8-bis(methylmercapto)-5-hydroxycaprylic acid δ-lactone*

About 8.5 g. of 6,8-bis(methylmercapto)-5-oxocaprylic acid is dissolved in 370 ml. of ethanol and 26 ml. of water is added. The solution is cooled in an ice bath and 6.7 g. of sodium borohydride is added portionwise. After the initial vigorous reaction has subsided the mixture is allowed to stand at room temperature for two hours. The mixture is acidified to pH 3 with concentrated hydrochloric acid, filtered and the filtrate adjusted to pH 8 with 8 N sodium hydroxide. After filtration the ethanol is removed by evaporation under reduced pressure. 100 ml. of water is added, the pH is adjusted to 3 and the 6,8-bis(methylmercapto)-5-hydroxycaprylic acid δ-lactone is isolated by chloroform extraction. The chloroform solution is dried over anhydrous magnesium sulfate, filtered and evaporated to isolate the product. It is purified by distillation under reduced pressure at a pot temperature of 165–190° C. at pressures of 75–300μ; $N_D^{25}$=1.5384—1.5398; mol. weight (ebulliometric) 234±2 (calc. 234).

EXAMPLE 2

*6,8-bis(ethylmercapto)-5-hydroxycaprylic acid δ-lactone*

Seven ml. of water and 100 ml. of ethanol are combined and 2.5 g. of 6,8-bis(ethylmercapto)-5-oxocaprylic acid is added to the mixture. The solution is cooled and 2 g. of sodium borohydride is added slowing with stirring. After the reaction is completed the mixture is acidified with sulfuric acid and the δ-lactone of 6,8-bis(ethylmercapto)-5-hydroxycaprylic acid is thereby obtained. The mixture is filtered and concentrated under reduced pressure. The concentrate is diluted with water, acidified and extracted with ether. The product is obtained by removing the solvent under diminished pressure.

EXAMPLE 3

*6,8-bis(allylmercapto)-5-hydroxycaprylic acid δ-lactone*

Five g. of 6,8-bis(allylmercapto)-5-oxocaprylic acid is dissolved in 220 ml. of dioxane and 40 ml. of water and cooled. To the cooled solution is added about 4 g. of potassium borohydride at such a rate as to prevent overheating. After the vigorous reaction has subsided the mixture is warmed to room temperature and allowed to stand for several hours. The mixture is acidified with hydrochloric acid, filtered, the pH adjusted to 7 concentrated and extracted with chloroform. The chloroform extract is concentrated under diminished pressure to remove the solvent. The 6,8-bis(allylmercapto)-5-hydroxycaprylic acid δ-lactone is purified by distillation under reduced pressure.

EXAMPLE 4

*6,8-bis(phenylmercapto)-5-hydroxycaprylic acid δ-lactone*

8 g. of lithium borohydride is added slowly to a cooled solution of 10 g. of 6,8-bis(phenylmercapto)-5-oxocaprylic acid in 350 ml. of tetrahydrofuran and 50 ml. of water. The reaction is vigorous and cooling is maintained to prevent overheating. After completion of the reaction hydrochloric acid is added to pH 3. The mixture is filtered, and concentrated under reduced pressure. After dilution with water the product is extracted with chloroform and the extract is concentrated under diminished pressure to give the δ-lactone of 6,8-bis(phenylmercapto)-5-hydroxycaprylic acid.

EXAMPLE 5

*6,8-bis(benzylmercapto)-5-hydroxycaprylic acid δ-lactone*

Four g. of 6,8-bis(benzylmercapto)-5-oxocaprylic acid is dissolved in 100 ml. of methanol and 10 ml. of water. The mixture is cooled and 4 g. of sodium borohydride is added slowly in small portions. The mixture is warmed to room temperature, and after several hours is acidified with sulfuric acid and filtered. The mixture, adjusted to pH 7, is concentrated under reduced pressure, diluted with water and extracted with ether. The ether is removed in vacuo and the 6,8-bis(benzylmercapto)-5-hydroxycaprylic acid δ-lactone is purified by distillation under reduced pressure.

EXAMPLE 6

*6-methylmercapto-8-ethylmercapto-5-hydroxycaprylic acid δ-lactone*

To a cooled solution of 7 g. of 6-methylmercapto-8-ethylmercapto-5-oxocaprylic acid in 300 ml. of methanol and 75 ml. of water is added very slowly 6 gm. of sodium borohydride with stirring. Heat is evolved and cooling is continued until the reaction subsides. The mixture is allowed to warm to room temperature gradually and after several hours is acidified with hydrochloric acid to pH 2. The mixture is filtered, adjusted to pH 7 with sodium hydroxide and filtered. The filtrate is concentrated, diluted with water and acidified with hydrochloric acid. The product is extracted with ether and isolated by concentration under reduced pressure. The 6-methylmercapto-8-ethylmercapto-5-hydroxycaprylic acid δ-latcone is recovered as an oil.

EXAMPLE 7

*6,8-bis(methylmercapto) caprylic acid*

1.36 g. of 6,8-bis(methylmercapto)-5-hydroxycaprylic acid δ-lactone is dissolved in 25 ml. of glacial acetic acid and 5 ml. of water. To this solution is added 540 mg. of red phosphorus and 2.21 g. of iodine. The mixture is refluxed for 17 hours, cooled, filtered and then diluted with 120 ml. of water. The excess iodine is reduced by the addition of aqueous sodium bisulfite and the solution is extracted with chloroform. The chloroform extract is washed with saturated aqueous sodium chloride, dried over anhydrous magnesium sulfate, and concentrated under reduced pressure to yield 6,8-bis(methylmercapto) caprylic acid.

The methyl ester is prepared by reacting 6,8-bis(methylmercapto) caprylic acid with phosphorus trichloride to prepare the corresponding acyl chloride which upon reaction with methanol gives the desired methyl ester. The ethyl, propyl, benzyl and phenyl esters are prepared in a similar manner.

Salts of 6,8-bis,(methylmercapto) caprylic acid are produced by reacting the acid with a base such as an alkali metal or alkaline earth metal hydroxide, bicarbonate or carbonate.

EXAMPLE 8

*6,8-bis(ethylmercapto) caprylic acid*

About 0.5 g. of 6,8-bis(ethylmercapto)-5-hydroxycaprylic acid δ-lactone is added to 20 ml. of phosphoric acid (90%) and 3 ml. of water. After adding 0.15 g. of red phosphorus and 1 g. of iodine the mixture is refluxed for 10 hours. The mixture is cooled, sodium bisulfite added to reduce the iodine and the mixture is extracted with ether. The ether extract is concentrated to obtain, 6,8-bis(ethylmercapto) caprylic acid. The product is further purified by bicarbonate extraction and by distillation under reduced pressure.

EXAMPLE 9

*6,8-bis(allylmercapto) caprylic acid*

To a mixture of 10 ml. of glacial acetic acid and 1 ml. of water is added 0.45 g. of 6,8-bis(allylmercapto)-5-hydroxycaprylic acid δ-lactone. The mixture is cooled and 0.1 g. of red phosphorus and 0.5 g. of iodine is added. After refluxing for 6 hours the mixture is cooled, sodium bisulfite is added to reduce the iodine and the product is extracted with chloroform. The chloroform solution is extracted with saturated aqueous sodium bicarbonate and the acidic product is isolated by acidifying to pH 3 and extraction with chloroform. The 6,8-bis(allylmercapto) caprylic acid is isolated by evaporating the solvent.

Other compounds which are prepared by this process by reduction of the corresponding 5-hydroxy procursors are 6,8-bis(benzylmercapto) caprylic acid, 6,8-bis(phenylmercapto) caprylic acid, 6-methylmercapto-8-ethylmercapto caprylic acid and 6-benzylmercapto-8-methylmercapto caprylic acid.

EXAMPLE 10

*6,8-dithioloctanoic acid from 6,8-bis(methylmercapto) caprylic acid*

About 314 mg. of 6,8-bis(methylmercapto) caprylic acid in 5 ml. of 50% aqueoue sulfuric acid is heated at 85° C. for 3½ hours. The mixture is then poured into water and the 6,8-dithioloctanoic acid is extracted with chloroform and concentrated under reduced pressure to isolate the product.

Alpha lipoic acid is prepared from the 6,8-dithioloctanoic acid produced above by reacting it in chloroform with aqueous 10% iodine-potassium iodide. The excess iodine is reduced with aqueous sodium bisulfite, the chloroform extract is washed with water, dried over anhydrous magnesium sulfate and concentrated under reduced pressure to isolate the product.

EXAMPLE 11

*6,8-dithioloctanoic acid from 6,8-bis(allylmercapto) caprylic acid*

To 10 ml. of concentrated hydrochloric acid is added 1 gm. of 6,8-bis(allylmercapto) caprylic acid and the mixture heated at 50° C. for 10 hours. The mixture is cooled, added to water and the 6,8-dithioloctanoic acid extracted with ether. The product is recovered by evaporating the solvent.

EXAMPLE 12

*6,8-dithioloctanoic acid from 6,8-bis(benzylmercapto) caprylic acid*

A concentrated aqueous solution (10 ml.) of phosphoric acid is warmed and to it is added 0.5 g. of 6,8-bis-(benzylmercapto) caprylic acid. The mixture is heated to 100° C. for 2 hours, cooled and water is added. Recovery of 6,8-dithioloctanoic acid is achieved by extraction with chloroform and concentration under reduced pressure.

EXAMPLE 13

*6,8-dithioloctanoic acid by hydrogenolysis of 6,8-bis (allylmercapto) caprylic acid*

Into 100 ml. of liquid ammonia is placed 1 g. of 6,8-bis(allylmercapto) caprylic acid with stirring. Following solution about 1 g. of sodium is added in increments. Ammonium chloride is added to neutralize the excess sodium and the ammonia removed by evaporation under reduced pressure. 50 ml. of water is added to the residue and enough concentrated hydrochloric acid added to reach pH 3. The 6,8-dithioloctanoic acid is extracted with chloroform and is isolated by evaporation of the solvent.

EXAMPLE 14

*5-hydroxy-6,8-dithioloctanoic acid-δ-lactone*

About 1.2 g. of 6,8-bis(allylmercapto)-5-hydroxycaprylic acid is dissolved in 100 ml. of liquid ammonia and sodium is added in small portions until the blue color is permanent. The excess sodium is neutralized by the addition of ammonium sulfate to the mixture. The liquid ammonia is allowed to evaporate, the residue is taken up in 30 ml. of water and the solution is acidified to pH 3 with concentrated hydrochloric acid. The mixture is extracted with ether and the 5-hydroxy-6,8-dithioloctanoic acid-δ-lactone is isolated by evaporation of the solvent.

Its infrared spectrum in carbon tetrachloride solution shows a bonded hydroxyl group in the 3–4μ region and a strong bond at 5.85μ indicative of the carboxyl group. In addition, the absence of a band at 6.09μ shows complete removal of the allylic groups.

EXAMPLE 15

*5-hydroxy-5[3-(1,2-dithiacyclopentyl)] pentanoic acid-δ-lactone*

The 5-hydroxy-6,8-dithioloctanoic acid δ-lactone produced as in Example 14 is taken up in ether and oxidized with aqueous 10% iodine-potassium iodide. Excess iodine is reduced with aqueous sodium bisulfite. The 5-hydroxy-5[3-(1,2-dithiacyclopentyl)] pentanoic acid-δ-lactone is isolated by evaporation of the solvent under diminished pressure. Its ultra-violet spectrum shows a shoulder at 273 mμ (5%=12.6) and a plateau at 320 mμ (5%=5.4).

EXAMPLE 16

*6,8-dithioloctanoic acid by hydrogenolysis of 6,8-bis (benzylmercapto) caprylic acid*

To 100 ml. of liquid ammonia is added 0.5 g. of 6,8-bis(benzylmercapto) caprylic acid with stirring. Metallic sodium is then added until a blue color persists. When a persistant blue color is obtained, ammonium chloride is added to neutralize the excess sodium and the ammonia is removed by evaporation under reduced pressure. 50 ml. of water is added to the residue plus sufficient hydrochloric acid to make the solution pH 3. The 6,8-dithioloctanoic acid is isolated by extraction into chloroform and removal of the organic solvent.

EXAMPLE 17

*6,8-dithioloctanoic acid from 6,8-bis(methylmercapto) caprylic acid*

133 mg. of 6,8-bis(methylmercapto) octanoic acid and 500 mg. of thiouronium chloride are mixed and heated at 160° C. for one hour. The mixture is cooled to room temperature and 3 ml. of 2.5 N NaOH is added. The solution is heated at 80° C. for ninety minutes. After being cooled to room temperature the mixture is acidified to pH 3 with concentrated hydrochloric acid and extracted with chloroform. The chloroform extract is evaporated to give 6,8-dithioloctanoic acid as a residue.

Various changes and modifications of the invention can be made and to the extent that such variations incorporate the spirit of this invention they are intended to be included within the scope of the appended claims.

What is claimed is:

1. Compounds having the formula—

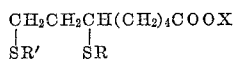

wherein X is selected from the group consisting of alkali and alkaline earth metals, hydrogen, and alkyl, aryl and aralkyl groups having up to eight carbon atoms and R and R′ are selected from the class consisting of alkyl, alkenyl, alkynyl, aryl and aralkyl groups having up to eight carbon atoms.

2. A compound of the formula—

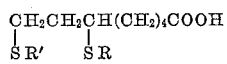

wherein R and R′ are selected from the class consisting of alkyl, alkenyl, alkynyl, aryl and aralkyl groups having up to eight carbon atoms.

3. A 6,8-bis(lower alkylmercapto)caprylic acid.
4. A 6,8-bis(lower alkenylmercapto)caprylic acid.
5. 6,8-bis(methylmercapto)caprylic acid.
6. 6,8-bis(allylmercapto)caprylic acid.
7. The process which comprises reacting the δ-lactone of a compound of the formula—

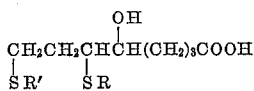

with phosphorus and iodine to produce a compound of the formula—

wherein R and R′ are selected from the class consisting of alkyl, alkenyl, alkynyl, aryl and aralkyl groups having up to eight carbon atoms.

8. The process which comprises reacting a 6,8-bis(lower alkylmercapto)-5-hydroxycaprylic acid δ-lactone with a mixture of phosphorus and iodine to produce the corresponding 6,8-bis(lower alkylmercapto)caprylic acid.

9. The process which comprises reacting a 6,8-bis(methylmercapto)-5-hydroxycaprylic acid δ-lactone with a mixture of phosphorus and iodine to produce the corresponding 6,8-bis(methylmercapto)caprylic acid.

10. The process which comprises reacting a 6,8-bis(lower alkenylmercapto)-5-hydroxycaprylic acid δ-lactone with a mixture of phosphorus and iodine to produce the corresponding 6,8-bis(lower alkenylmercapto)caprylic acid.

11. The process which comprises reacting a 6,8-bis(allylmercapto)-5-hydroxycaprylic acid δ-lactone with a mixture of phosphorus and iodine to produce the corresponding 6,8-bis(allylmercapto)caprylic acid.

12. The process which comprises treating a compound of the formula—

with an alkali metal in liquid ammonia to produce 6,8-dithioloctanoic acid, wherein $R^2$ and $R^3$ represent hydrocarbon groups from the class consisting of lower alkenyl and aralkyl groups.

13. The process which comprises reacting a 6,8-bis(hydrocarbon substituted mercapto)caprylic acid with a member of the group consisting of non-oxidizing mineral acids and thiourea hydrohalides to form 6,8-dithioloctanoic acid.

14. The process which comprises reacting 6,8-bis(methylmercapto)caprylic acid with sulfuric acid to produce 6,8-dithioloctanoic acid.

15. The process which comprises reacting 6,8-bis(allylmercapto)caprylic acid with hydrochloric acid to produce 6,8-dithioloctanoic acid.

16. The process which comprises reacting 6,8-bis(benzylmercapto)caprylic acid with phosphoric acid to produce 6,8-dithioloctanoic acid.

17. The process which comprises reacting 6,8-bis(methylmercapto)octanoic acid with thiouronium chloride to produce 6,8-dithioloctanoic acid.

18. A process which comprises reacting a compound having the formula—

wherein R and R′ are selected from the class consisting of alkyl, alkenyl, alkynyl, aryl and aralkyl groups having up to eight carbon atoms with an alcohol having the formula R″OH wherein R″ is selected from the class consisting of alkyl, aryl and aralkyl groups having up to eight carbon atoms in the presence of a non-oxidizing mineral acid to produce the corresponding ester having the formula—

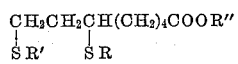

19. A process which comprises reacting a compound having the formula—

wherein R and R′ are selected from the class consisting of alkyl, alkenyl, alkynyl, aryl and aralkyl groups having up to eight carbon atoms with an halogenating agent to produce the corresponding acyl halide having the formula—

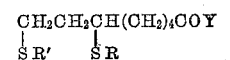

wherein Y is a halogen.

20. A process which comprises reacting a compound having the formula—

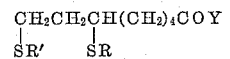

wherein R and R′ are selected from the class consisting of alkyl, alkenyl, alkynyl, aryl and aralkyl groups having up to eight carbon atoms and Y is a halogen with an alcohol having the formula R″OH wherein R″ is lower alkyl to form the corresponding ester having the formula—

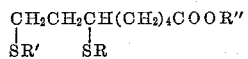

21. A process which comprises reacting a compound having the formula—

wherein R and R′ are selected from the class consisting of alkyl, alkenyl, alkynyl, aryl and aralkyl groups having up to eight carbon atoms with a base to form the corresponding salt.

22. Compound having the formula—

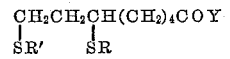

wherein R and R′ are selected from the class consisting of alkyl, alkenyl, alkynyl, aryl and aralkyl groups having up to eight carbon atoms and Y is a halogen.

23. 6,8-dibenzylmercaptooctanoic acid.

24. The method which comprises subjecting 6,8-dibenzylmercaptooctanoic acid to the action of alkali metal in liquid ammonia until the corresponding alkali metal salt of 6,8-dimercaptooctanoic acid is produced.

No references cited.